(12) United States Patent
Sung et al.

(10) Patent No.: US 11,725,565 B2
(45) Date of Patent: Aug. 15, 2023

(54) EXHAUST PIPE APPARATUS AND SHIP COMPRISING SAME

(71) Applicant: SAMSUNG HEAVY IND. CO., LTD., Seoul (KR)

(72) Inventors: Yongwook Sung, Gyeongsangnam-do (KR); Jaegwan Kim, Gyeongsangnam-do (KR); Moon-ho Son, Gyeongsangnam-do (KR); Seungjae Lee, Gyeongsangnam-do (KR)

(73) Assignee: SAMSUNG HEAVY IND. CO., LTD., Seoul (KR)

( * ) Notice: Subject to any disclaimer, the term of this patent is extended or adjusted under 35 U.S.C. 154(b) by 0 days.

(21) Appl. No.: 17/639,835

(22) PCT Filed: Aug. 28, 2020

(86) PCT No.: PCT/KR2020/011571
§ 371 (c)(1),
(2) Date: Mar. 2, 2022

(87) PCT Pub. No.: WO2021/045455
PCT Pub. Date: Mar. 11, 2021

(65) Prior Publication Data
US 2022/0325651 A1 Oct. 13, 2022

(30) Foreign Application Priority Data

Sep. 6, 2019 (KR) .......................... 10-2019-0110767

(51) Int. Cl.
*F01N 13/00* (2010.01)
*F01N 13/08* (2010.01)

(52) U.S. Cl.
CPC ............ *F01N 13/08* (2013.01); *F01N 13/004* (2013.01); *F01N 2570/10* (2013.01); *F01N 2590/02* (2013.01)

(58) Field of Classification Search
CPC ........ B63H 23/32; B63J 2/12; B63J 2002/125; F01N 3/0205; F01N 3/0857; F01N 5/02;
(Continued)

(56) References Cited

U.S. PATENT DOCUMENTS 3,906,945 A  9/1975 Netteland et al.
10,006,389 B2 * 6/2018 Fukui ................... F01N 3/2053
(Continued)

FOREIGN PATENT DOCUMENTS

DE  10 2015 119 561   5/2016
JP       5-31325        2/1993
(Continued)

OTHER PUBLICATIONS

International Search Report for PCT/KR2020/011571 dated Dec. 17, 2020 and its English translation from WIPO (now published as WO 2021/045455).

(Continued)

*Primary Examiner* — Audrey B. Walter
*Assistant Examiner* — Dapinder Singh
(74) *Attorney, Agent, or Firm* — Ladas & Parry, LLP (57) ABSTRACT

The present disclosure relates to an exhaust pipe apparatus. The exhaust pipe apparatus includes a first exhaust pipe provided to directly discharge exhaust gas discharged from a combustion engine to the outside, a second exhaust pipe connected in parallel with the first exhaust pipe and having a branch pipe connected to one side thereof such that the exhaust gas is directly discharged to the outside or discharged through the branch pipe, and a first damper installed in the second exhaust pipe to control a flow of the exhaust (Continued)

gas to be directly discharged to the outside or discharged through the branch pipe.

10 Claims, 7 Drawing Sheets

(58) Field of Classification Search
CPC .... F01N 13/001; F01N 13/004; F01N 13/011; F01N 13/08; F01N 13/085; F01N 13/087; F01N 2240/02; F01N 2240/36; F01N 2240/18; F01N 2410/00; F01N 2410/14; F01N 2410/02; F01N 2410/03; F01N 2410/04; F01N 2410/08; F01N 2410/10; F01N 2570/10; F01N 2590/02; Y02T 10/12; Y02T 10/40; Y02T 70/50; Y02A 50/20
See application file for complete search history.

(56) References Cited

U.S. PATENT DOCUMENTS

| | | |
|---|---|---|
| 2015/0033711 A1 | 2/2015 | Hyde et al. |
| 2016/0146097 A1* | 5/2016 | Ge .................. F02B 37/013 60/273 |

FOREIGN PATENT DOCUMENTS

| | | |
|---|---|---|
| JP | 2004278401 | * 10/2004 |
| JP | 2010-088982 | 4/2010 |
| JP | 2012-037089 | 2/2012 |
| JP | 5717998 | 5/2015 |
| KR | 10-1059535 | 8/2011 |
| KR | 10-1454385 | 11/2014 |
| WO | 2016/038727 | 3/2016 |

OTHER PUBLICATIONS

Written Opinion of the International Searching Authority for PCT/KR2020/011571 dated Dec. 17, 2020 and its English translation by Google Translate (now published as WO 2021/045455).

Office Action in the Korean Application No. 10-2019-0110767, dated Oct. 22, 2020, with English translation provided by Google Translate.

Notice of Allowance in the Korean Application No. 10-2019-0110767, dated Jan. 21, 2021, with English translation provided by Google Translate.

Office Action dated Apr. 4, 2023 for Japanese Patent Application No. 2022-514825 and its English machine translation from Global Dossier.

* cited by examiner

EXHAUST PIPE APPARATUS AND SHIP COMPRISING SAME

TECHNICAL FIELD

The present disclosure relates to an exhaust pipe apparatus and a ship including the same, and more particularly, to an exhaust pipe apparatus capable of branching and discharging exhaust gas, and a ship capable of reducing energy consumed in increasing the temperature of an absorbent in order to separate carbon dioxide from the absorbent in which the carbon dioxide is absorbed.

Background Art

In general, various engines installed in ships generate power by burning fuel, and exhaust gas generated in the process of combustion of fuel includes nitrogen oxides, sulfur oxides, carbon dioxide, and the like. As air pollution increases, regulations on various harmful substances included in exhaust gas are becoming stricter, and not only nitrogen oxides and sulfur oxides, but also is also subject to emission control from the International Maritime Organization (IMO), an organization affiliated with the United Nations. There are two major methods for capturing carbon dioxide contained in exhaust gas: a wet capture method using an absorbent and a dry capture method using a membrane. In the wet capture method, exhaust gas passes through an absorption part in which an absorbent is provided so that carbon dioxide contained in the exhaust gas is absorbed by the absorbent, and the absorbent in which the carbon dioxide is absorbed passes through a regeneration part so that the carbon dioxide and the absorbent are separated.

The regeneration part separates the carbon dioxide from the absorbent by increasing the temperature of the absorbent to about 150 to 200° C. Because high temperature steam is required to increase the temperature of the absorbent and a boiler is operated to generate steam, there is a problem that not only consumes a lot of energy, but also additional carbon dioxide is generated. Therefore, in the prior art, a method of supplying exhaust gas to a reboiler that heats the absorbent supplied to the regeneration part to provide heat, and then moving the exhaust gas to the absorption part was used, but in this case, there is a problem in that a large amount of differential pressure is applied to the exhaust gas, thereby decreasing engine efficiency.

Therefore, there is a need for an exhaust pipe apparatus having a structure capable of branching and discharging exhaust gas and a ship having a structure capable of reducing energy consumed to increase the temperature of an absorbent.

Disclosure

Technical Problem

The present disclosure is directed to providing an exhaust pipe apparatus capable of branching and discharging exhaust gas.

The present disclosure is directed to providing a ship capable of reducing energy consumed in increasing the temperature of an absorbent in order to separate carbon dioxide from the absorbent in which the carbon dioxide is absorbed.

The above objects of the present disclosure are not limited to those mentioned above, and other objects not mentioned will be clearly understood by those skilled in the art from the following description.

Technical Solution

An aspect of the present disclosure provides an exhaust pipe apparatus including a first exhaust pipe provided to directly discharge exhaust gas discharged from a combustion engine of a ship to the outside, a second exhaust pipe connected in parallel with the first exhaust pipe and having a branch pipe connected to one side thereof such that the exhaust gas is directly discharged to the outside or discharged through the branch pipe, and a first damper installed in the second exhaust pipe to control a flow of the exhaust gas to be directly discharged to the outside or discharged through the branch pipe.

The first exhaust pipe and the second exhaust pipe may be provided by partitioning the inside of an exhaust pipe formed of an integral body.

The exhaust pipe apparatus may further include a first economizer installed on the first exhaust pipe to generate steam by heat exchange with the exhaust gas, wherein the exhaust gas discharged to the branch pipe and the steam may be supplied to a carbon dioxide capture apparatus.

The exhaust pipe apparatus may further include a second damper installed in at least one of the first exhaust pipe and the second exhaust pipe to adjust a flow amount of the exhaust gas to be discharged through the first exhaust pipe and the second exhaust pipe.

The exhaust pipe apparatus may further include a second economizer installed at at least one of a position between the first exhaust pipe and the second exhaust pipe at a front end of the second damper and a position between the first exhaust pipe and the second exhaust pipe between the second damper and the first damper, to generate first auxiliary steam by exchanging heat with the exhaust gas, wherein the first auxiliary steam may be supplied to a carbon dioxide capture apparatus.

The exhaust pipe apparatus may further include a third economizer installed in the second exhaust pipe at a rear end of the first damper to generate second auxiliary steam by exchanging heat with the exhaust gas.

Another aspect of the present disclosure provides a ship including a hull, a first exhaust pipe provided to directly discharge exhaust gas discharged from a combustion engine installed in the hull to the outside, a second exhaust pipe connected in parallel with the first exhaust pipe and having a branch pipe connected to one side thereof such that the exhaust gas is directly discharged to the outside or discharged through the branch pipe, a first damper installed in the second exhaust pipe to control a flow of the exhaust gas to be directly discharged to the outside or discharged through the branch pipe, a first economizer installed on the first exhaust pipe to generate steam by heat exchange with the exhaust gas, and a carbon dioxide capture apparatus provided to receive the exhaust gas discharged from the branch pipe and the steam to remove carbon dioxide contained in the exhaust gas.

The carbon dioxide capture apparatus may include an absorption part provided to spray an absorbent in which carbon dioxide is absorbed into the exhaust gas, a regeneration part provided to receive the absorbent in which the carbon dioxide is absorbed from the absorption part and separate the carbon dioxide from the absorbent, and a reboiler provided to heat the absorbent supplied to the regeneration part using the steam.

The ship may further include a first supply pipe provided to supply the steam generated in the first economizer to the reboiler.

The ship may further include a second economizer installed between the first exhaust pipe and the second exhaust pipe to generate first auxiliary steam by exchanging heat with the exhaust gas, and a second supply pipe provided to supply the first auxiliary steam to the reboiler.

The ship may further include a controller provided to adjust an amount of steam to be supplied to the reboiler in response to an amount of exhaust gas emission of the combustion engine.

Advantageous Effects

According to the present disclosure, one part of exhaust gas discharged from a combustion engine can be supplied to a first economizer and utilized to generate steam, only the other part can be subjected to a carbon dioxide removal process, and steam generated from the branched exhaust gas can be supplied to a reboiler. Therefore, because the operation of a separate boiler for steam generation is minimized, energy consumption can be reduced, and additional generation of carbon dioxide can be prevented.

In addition, because steam is generated using waste heat of exhaust gas, overall system efficiency can be increased.

MODE OF THE DISCLOSURE

Advantages and features of the present disclosure, and how to achieve them, will become apparent with reference to the embodiments described below in detail in conjunction with the accompanying drawings. However, the present disclosure is not limited to the embodiments disclosed below and may be implemented in various different forms, these embodiments are only provided to ensure that the disclosure of the present disclosure is complete, and to completely inform those of ordinary skill in the art to which the present disclosure belongs, the scope of the invention, and the present disclosure is only defined by the scope of the claims. Throughout the specification, like reference numbers refer to like elements.

Hereinafter, an exhaust pipe apparatus according to an embodiment of the present disclosure will be described in detail with reference to FIG. 1.

An exhaust pipe apparatus according to an embodiment of the present disclosure may be configured to branch exhaust gas such that one part of the exhaust gas is discharged to the outside and the other part of the exhaust gas is discharged to the outside or branched to be subjected to a carbon dioxide removal process. In particular, because the steam generated by the recovery of waste heat of the exhaust gas is utilized in the carbon dioxide removal process, an operation of a separate boiler for steam generation is minimized, energy consumption may be reduced, and additional generation of carbon dioxide may be prevented.

Hereinafter, an exhaust pipe apparatus 100 will be described in detail with reference to FIG. 1.

Figure 1:
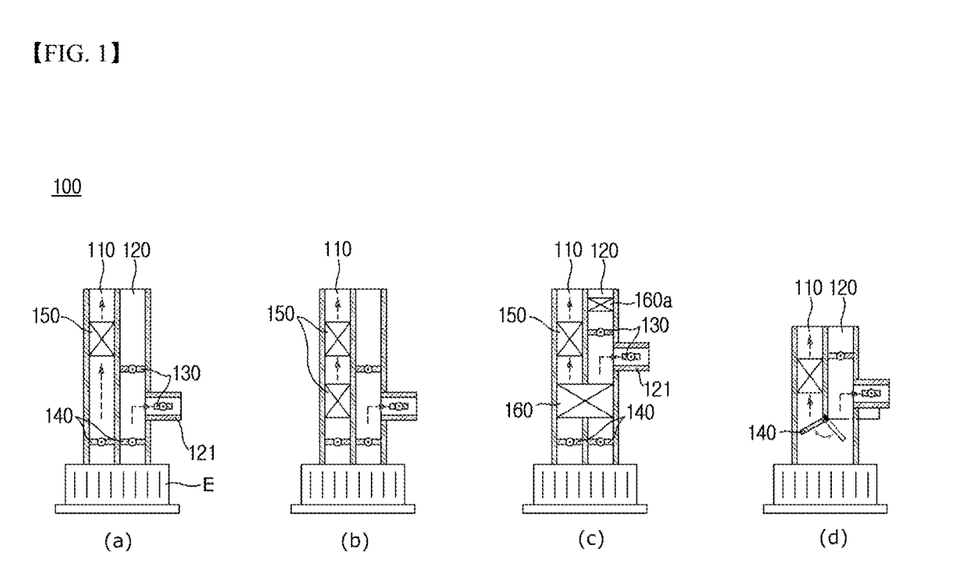
FIG. 1 is a view illustrating various shapes of an exhaust pipe according to an embodiment of the present disclosure.

FIG. 1 is a view illustrating various shapes of an exhaust pipe according to an embodiment of the present disclosure.

The exhaust pipe apparatus 100 according to the present disclosure includes a first exhaust pipe 110, a second exhaust pipe 120, and a first damper 130.

The first exhaust pipe 110 is provided to directly discharge exhaust gas discharged from a combustion engine E to the outside, and may discharge exhaust gas that has passed through an exhaust gas pretreatment facility, such as a selective catalytic reduction (SCR) facility, a dust collection facility, and a desulfurization facility, to the outside. As illustrated in FIG. 1A, because a first economizer 150 is installed in the first exhaust pipe 110, the exhaust gas flowing through the first exhaust pipe 110 may pass through the first economizer 150 and then be discharged to the outside. The first economizer 150 is provided to generate steam by exchanging exhaust gas with water, and at least one of the first economizer 150 may be installed in the first exhaust pipe 110. As illustrated in FIG. 1B, when a plurality of the first economizers 150 is installed in the first exhaust pipe 110, the plurality of first economizers 150 may be arranged in a line along the first exhaust pipe 110. When the plurality of first economizers 150 is installed in the first exhaust pipe 110, waste heat of the exhaust gas may be more efficiently recovered to generate a larger amount of steam, and due to this, apparatus efficiency may be further increased. The exhaust gas heat-exchanged with water in the first economizer 150 is exhausted to the outside, and steam generated by the heat exchange between the exhaust gas and water may be supplied to a carbon dioxide capture apparatus 170, which will be described later, through a separate pipe.

The second exhaust pipe 120 is connected in parallel with the first exhaust pipe 110, and may have a branch pipe 121 connected to one side thereof to directly discharge the exhaust gas to the outside or to discharge the exhaust gas through the branch pipe 121. In this case, the exhaust gas flowing through the second exhaust pipe 120, like the exhaust gas flowing through the first exhaust pipe 110, may be in a state of passing through the exhaust gas pretreatment facility, and the exhaust gas discharged into the branch pipe 121 may be supplied to the carbon dioxide capture apparatus 170 to be subjected to the carbon dioxide removal process. The first exhaust pipe 110 and the second exhaust pipe 120 may be formed by partitioning the inside of an exhaust pipe made of an integral body, and an area ratio of lateral cross-sectional areas may be 30:70 to 70:30.

Although not shown in the drawing, the first exhaust pipe 110 and the second exhaust pipe 120 may be spaced apart from each other and disposed in parallel so that one end of each of the exhaust pipes 110 and 120 is connected to the combustion engine E.

The first damper 130 is installed in the second exhaust pipe 120. The first damper 130 is provided to control a flow of exhaust gas to be directly discharged to the outside or to be discharged through the branch pipe 121, and may be installed in at least one of the second exhaust pipe 120 and the branch pipe 121. Although the drawing illustrates that the first dampers 130 are installed in the second exhaust pipe 120 and the branch pipe 121, respectively, the present disclosure is not limited thereto, and the number and arrangement of the first dampers 130 may be variously changed. For example, with one first damper 130, a flow of exhaust gas to be discharged to the outside and a flow of exhaust gas to be discharged to the branch pipe 121 may be simultaneously controlled.

A second damper 140 may be installed in at least one of the first exhaust pipe 110 and the second exhaust pipe 120. The second damper 140 is provided to control a flow of exhaust gas to be discharged through the first exhaust pipe 110 and the second exhaust pipe 120, and may be installed in each of the first exhaust pipe 110 and the second exhaust pipe 120 as illustrated in FIGS. 1A, 1B, and 1C, or may be installed at a boundary between the first exhaust pipe 110 and the second exhaust pipe 120 as illustrated in FIG. 1D.

A second economizer 160 may be installed between the first exhaust pipe 110 and the second exhaust pipe 120. The second economizer 160 may be installed in at least one of a position between the first exhaust pipe 110 and the second exhaust pipe 120 in front of the second damper 140 and a position between the first exhaust pipe 110 and the second exhaust pipe 120 between the second damper 140 and the first damper 130, to generate first auxiliary steam by heat exchange with the exhaust gas. As illustrated in FIG. 1C, when the second economizer 160 is installed in a position between the first exhaust pipe 110 and the second exhaust pipe 120 between the second damper 140 and the first damper 130, the exhaust gas flowing through the first exhaust pipe 110 sequentially passes through the second economizer 160 and the first economizer 150 and is then discharged to the outside, and the exhaust gas flowing through the second exhaust pipe 120 passes through the second economizer 160 and then may be discharged to the outside or may be supplied to the carbon dioxide capture apparatus 170 through the branch pipe 121. The first auxiliary steam generated in the second economizer 160 may be supplied to the carbon dioxide capture apparatus 170 through a separate pipe. At this time, the steam generated by the first economizer 150 and the first auxiliary steam generated by the second economizer 160 may join and then be supplied to the carbon dioxide capture apparatus 170, or may be separately supplied to the carbon dioxide capture apparatus 170.

A third economizer 160a may be installed in the second exhaust pipe 120. The third economizer 160a is installed in the rear of the first damper 130 in the second exhaust pipe 120, and may generate second auxiliary steam by heat exchange with the exhaust gas. The second auxiliary steam generated by the third economizer 160a may be supplied to another place where steam is demanded (not shown) in a ship when the carbon dioxide capture apparatus 170 is not operated.

Although the drawing illustrates that the first economizer 150, the second economizer 160, and the third economizer 160a are all installed, the present disclosure is not limited thereto, and any one of them may be installed as needed.

Hereinafter, a ship according to an embodiment of the present disclosure will be described in detail with reference to FIGS. 2 and 3.

Figure 2:
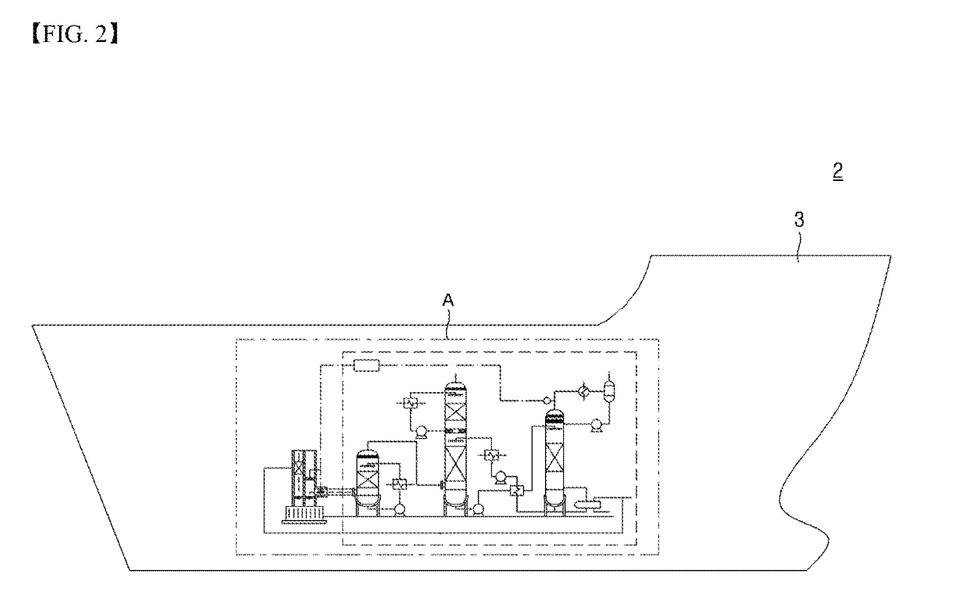
FIG. 2 is a view illustrating a ship according to an embodiment of the present disclosure.
Figure 3:
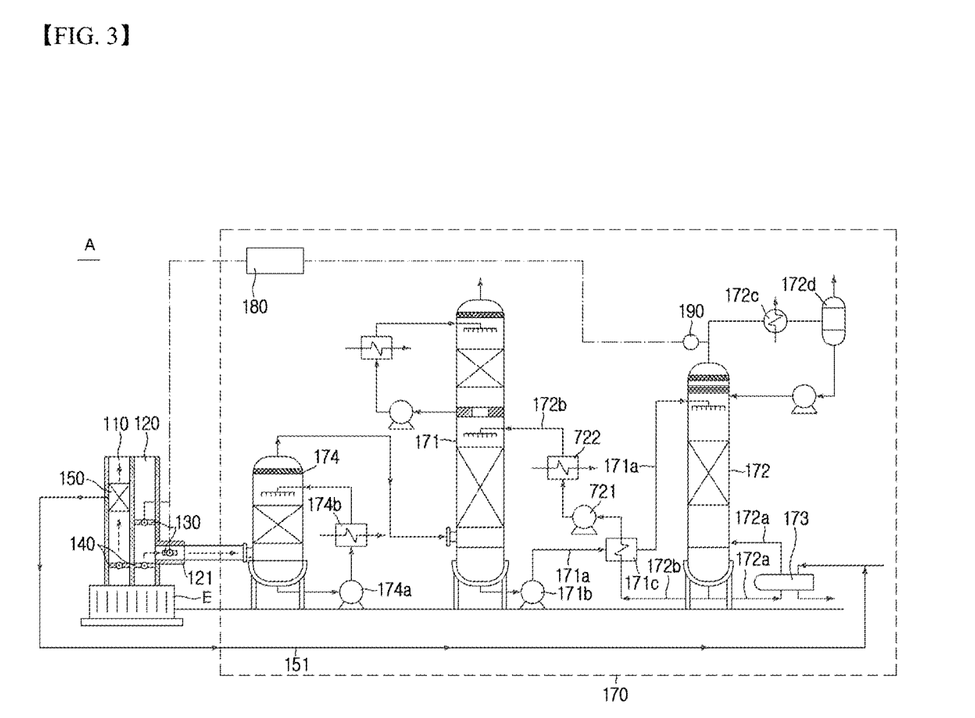
FIG. 3 is an enlarged view of part A in FIG. 2.

FIG. 2 is a view illustrating a ship according to an embodiment of the present disclosure, and FIG. 3 is an enlarged view of part A in FIG. 2.

A ship 2 according to the present disclosure is a hull 3, the first exhaust pipe 110, the second exhaust pipe 120, the first damper 130, the first economizer 150, and the carbon dioxide capture apparatus includes 170.

The hull 3 forming a body of the ship 2 may have an outer side surface formed in a streamlined shape. The first exhaust pipe 110, the second exhaust pipe 120, the first damper 130, the first economizer 150, and the carbon dioxide capture apparatus 170 are installed inside the hull 3.

The configuration of the first exhaust pipe 110, the second exhaust pipe 120, the first damper 130, and the first economizer 150 is replaced with the above description.

Although not shown in the drawing, the first exhaust pipe 110 and the second exhaust pipe 120 may be spaced apart from each other and disposed in parallel so that one end of each of the exhaust pipes 110 and 120 is connected to the combustion engine E.

The carbon dioxide capture apparatus 170 is provided to remove the exhaust gas discharged from the branch pipe 121 and carbon dioxide contained in the exhaust gas by supply of steam, and includes a cooling part 174, an absorption part 171, a regeneration part 172, and a reboiler 173.

The cooling part 174 is provided to cool the exhaust gas supplied through the branch pipe 121, and may cool the exhaust gas by injecting cooling water into the exhaust gas. Because the exhaust gas discharged from the combustion engine E installed in the ship is at a high temperature of about 150 to 400° C., when the exhaust gas is supplied as it is to the absorption part 171, which will be described later, carbon dioxide is not properly absorbed by the absorbent. That is, the absorbent injected from the absorption part 171 has a high absorption efficiency of carbon dioxide at about 30 to 50° C., the exhaust gas is cooled in advance in the cooling part 174. The exhaust gas supplied to the cooling part 174 is cooled to an appropriate temperature through heat exchange with cooling water, and the cooling water whose temperature is increased by heat exchange with the exhaust gas is discharged from the cooling part 174 and then circulated to the cooling part 174 again through a series of cooling processes. For example, the cooling water discharged from the cooling part 174 may be pressurized in a pump 174a and cooled by heat exchange with a cooling medium in a heat exchanger 174b, and then circulated to the cooling part 174. The exhaust gas cooled in the cooling part 174 is supplied to the absorption part 171.

The absorption part 171 is provided to atomize and spray the absorbent that has absorbed carbon dioxide contained in the exhaust gas supplied from the cooling part 174, and herein, the absorbent may be a solution having a property of absorbing carbon dioxide, for example, an aqueous solution of an amine compound or ammonia. The absorption part 171 may be formed as a gas contact type absorption tower to easily cope with fluctuations of the ship. The exhaust gas is supplied to a lower portion of the absorption part 171 and comes into contact with the absorbent injected from an upper portion of the absorption part 171, and due to this, carbon dioxide contained in the exhaust gas may be absorbed by the absorbent and removed from the exhaust gas. The exhaust gas from which the carbon dioxide is removed may be discharged to the outside through the upper portion of the absorption part 171. Because an exothermic reaction occurs when carbon dioxide is absorbed by the absorbent in absorption part 171, the exhaust gas from which the carbon dioxide is removed may be discharged to the outside after being subjected to a separate cooling process in the upper portion of the absorption part 171. For example, the exhaust gas from which the carbon dioxide is removed may be discharged after being cooled by coming into contact with a cooling medium such as fresh water sprayed from the upper portion of the absorption part 171, and the cooling medium may be collected after coming into contact with the exhaust gas and discharged to the outside of the absorption part 171, and then circulated back to the absorption part 171 through pressurization and cooling processes. The absorbent that has absorbed carbon dioxide in the absorption part 171 is supplied to the regeneration part 172 through a supply line 171a.

The supply line 171a may have one end connected to the lower portion of the absorption part 171 and the other end connected to an upper portion of the regeneration part 172 to supply the absorbent that has absorbed carbon dioxide discharged from the absorption part 171 to the upper portion of the regeneration part 172. On the supply line 171a, a pump 171b provided to pressurize the absorbent that has absorbed carbon dioxide, and a heat exchanger 171c provided to exchange heat between the supply line 171a and a second circulation line 172b, which will be described later, may be installed. The heat exchanger 171c heats the absorbent that has absorbed carbon dioxide at about 40 to 50° C. discharged from the absorption part 171 by exchanging heat with the absorbent from which carbon dioxide at about 80 to 150° C. discharged from the regeneration part 172 is separated. That is, the heat exchanger 171c exchanges heat between the absorbent supplied from the absorption part 171 to the regeneration part 172 through the supply line 171a and the absorbent circulating from the regeneration part 172 to the absorption part 171 through the second circulation line 172b, thereby increasing the temperature of the absorbent supplied to the regeneration part 172 and lowering the temperature of the absorbent circulated to the absorption part 171. Accordingly, carbon dioxide may be easily absorbed into the absorbent in the absorption part 171, and carbon dioxide may be easily separated from the absorbent in the regeneration part 172. The absorbent that has absorbed the carbon dioxide heated in the heat exchanger 171c may be introduced into the upper portion of the regeneration part 172.

The regeneration part 172 receives an absorbent in which carbon dioxide is absorbed from the absorption part 171 and separates carbon dioxide from the absorbent. More specifically, as the absorbent that has absorbed carbon dioxide supplied to the upper portion of the regeneration part 172 after being heated in the heat exchanger 171c flows from the upper portion to a lower portion of the regeneration part 172, the carbon dioxide is separated by thermal energy. At this time, one part of the absorbent in the regeneration part 172 is heated by being introduced into the reboiler 173 through a first circulation line 172a, and carbon dioxide and vapor generated from the absorbent by the heating of the reboiler 173 provide additional thermal energy by being supplied to the regeneration part 172 through the first circulation line 172a, thereby increasing the separation efficiency of carbon dioxide.

As described above, because the absorbent in which the carbon dioxide supplied to the regeneration part 172 is absorbed is in a state of being heated in the heat exchanger 171c, and carbon dioxide and steam generated from the absorbent heated in the reboiler 173 provide additional thermal energy, the carbon dioxide may be easily separated from the absorbent. The carbon dioxide of a high concentration separated from the absorbent is discharged to the upper portion of the regeneration part 172 and sequentially passes through a condenser 172c and a reflux drum 172d to remove moisture, and then may be supplied to a required place through a separate compression process. The water separated from the carbon dioxide is pressurized and circulated back to the regeneration part 172. A sensor 190 for measuring an amount of carbon dioxide discharged from the regeneration part 172 may be installed on one side of the regeneration part 172, and a result measured by the sensor 190 may be transmitted to a controller 180, which will be described later.

The reboiler 173 heats the absorbent supplied to the regeneration part 172 using the steam supplied from the first economizer 150, and may be installed on the first circulation line 172a through which the absorbent discharged from the regeneration part 172 is circulated back to the regeneration part 172. In other words, the reboiler 173 is installed on the first circulation line 172a and heats the absorbent flowing through the first circulation line 172a with the steam supplied from the first economizer 150 to generate carbon dioxide and steam, and supplies the carbon dioxide and vapor to the regeneration part 172. At this time, the steam may be supplied through the first supply pipe 151, and an amount of steam to be supplied to the reboiler 173 may be adjusted by the controller 180. The controller 180 may adjust the amount of steam to be supplied to the reboiler 173 in response to an amount of exhaust gas emission of the combustion engine E, or may control operations of the first damper 130 and the second damper 140 in response to the amount of carbon dioxide measured by the sensor 190 described above. For example, when the amount of exhaust gas emission of combustion engine E increases so that the amount of exhaust gas from which carbon dioxide should be removed is large, the controller 180 may increase the amount of steam to be supplied to the reboiler 173. At this time, when the amount of steam required by the reboiler 173 may not be satisfied only with the steam generated by the first economizer 150, the controller 180 may control such that steam is supplied to the reboiler 173 from a boiler installed in the ship. In addition, when the amount of carbon dioxide measured by the sensor 190 is greater than or equal to a reference value, the controller 180 may control the operation of the second damper 140 so that the amount of exhaust gas to be supplied to the cooling part 174 is reduced. By supplying steam generated by waste heat of the exhaust gas to the reboiler 173 as a heat source, not only the overall system efficiency is increased, but also the operation of a separate boiler for steam generation is minimized so energy consumption may be reduced, and the generation of additional carbon dioxide due to the operation of the boiler may also be prevented.

The second circulation line 172b may also be connected to the regeneration part 172. The second circulation line 172b is provided to circulate the absorbent discharged from the regeneration part 172 to the absorption part 171, and the above-described heat exchanger 171c, a pump 721, and a cooler 722 may be installed on the second circulation line 172b. The absorbent, in which the carbon dioxide at about 80 to 150° C. discharged from the regeneration part 172 through the second circulation line 172b is separated, is cooled primarily by exchanging heat with the absorbent flowing through the supply line 171a in the heat exchanger 171c, is pressurized in the pump 721 and cooled secondarily in the cooler 722, and then may be supplied to the absorption part 171 with about 30 to 50° C.

Hereinafter, a ship 2a according to another embodiment of the present disclosure will be described in detail with reference to FIGS. 4 and 5.

Figure 4:
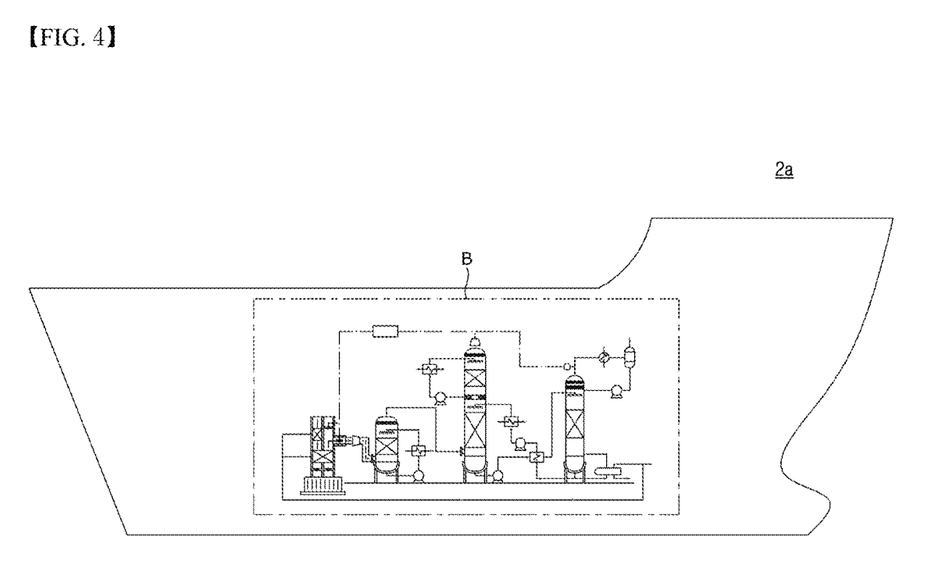
FIG. 4 is a view illustrating a ship according to another embodiment of the present disclosure.
Figure 5:
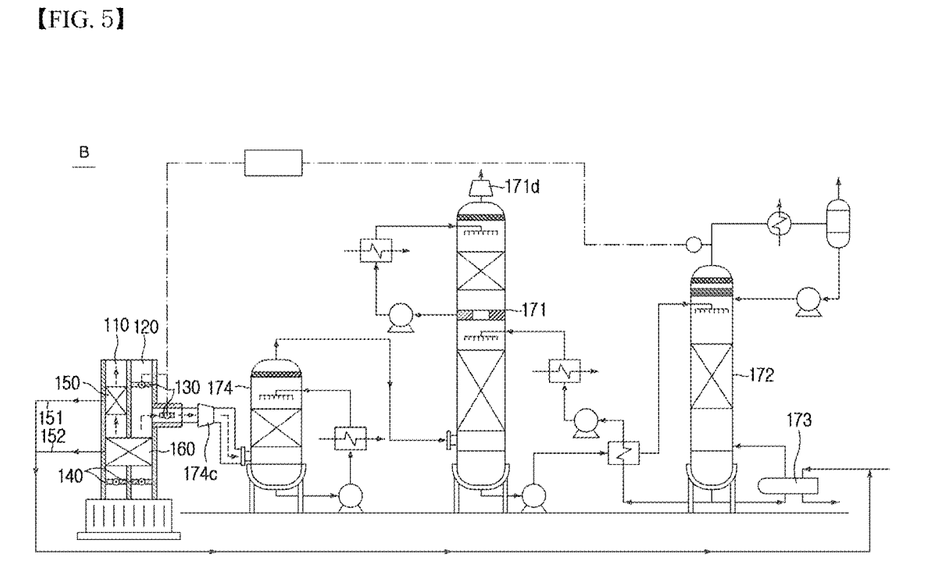
FIG. 5 is an enlarged view of part B in FIG. 4.

FIG. 4 is a view illustrating a ship according to another embodiment of the present disclosure, and FIG. 5 is an enlarged view of part B in FIG. 4.

In the ship 2a according to another embodiment of the present disclosure, the second economizer 160 is installed between the first exhaust pipe 110 and the second exhaust pipe 120, a compressor 174c is installed at a front end of the cooling part 174, and a blower 171d is installed above the absorption part 171. Excepting that the second economizer 160 is installed between the first exhaust pipe 110 and the second exhaust pipe 120, the compressor 174c is installed in the front end of the cooling part 174, and the blower 171d is installed above the absorption part 171, the ship 2a according to another embodiment of the present disclosure is substantially the same as in the embodiment described above. Therefore, the configuration of this exception will be mainly described, and the description of the remaining configuration will be replaced with the above description unless otherwise specified.

The second economizer 160 may be installed between the first exhaust pipe 110 and the second exhaust pipe 120. More specifically, the second economizer 160 may be installed in at least one of a position between the first exhaust pipe 110 and the second exhaust pipe 120 in front of the second damper 140 and a position between the first exhaust pipe 110 and the second exhaust pipe 120 between the second damper 140 and the first damper 130, to generate first auxiliary steam by heat exchange with the exhaust gas. As illustrated in the drawing, when the second economizer 160 is installed in a position between the first exhaust pipe 110 and the second exhaust pipe 120 between the second damper 140 and the first damper 130, the exhaust gas flowing through the first exhaust pipe 110 sequentially passes through the second economizer 160 and the first economizer 150 and is then discharged to the outside, and the exhaust gas flowing through the second exhaust pipe 120 passes through the second economizer 160 and then may be discharged to the outside or may be supplied to the carbon dioxide capture apparatus 170 through the branch pipe 121. The first auxiliary steam generated in the second economizer 160 may be supplied to the reboiler 173 through the second supply pipe 161, and the reboiler 173 may heat the absorbent supplied to the regeneration part 172 using the first auxiliary steam and the steam supplied from the second economizer 160 and the first economizer 150, respectively. Although the drawing illustrates that the first supply pipe 151 and the second supply pipe 161 are joined to be connected to the reboiler 173, the present disclosure is not limited thereto, and for example, the first supply pipe 151 and the second supply pipe 161 may be respectively connected to the reboiler 173.

The compressor 174c is installed in the front end of the cooling part 174. The compressor 174c is provided to pressurize exhaust gas to be supplied to the cooling part 174, and at least one of the compressor may be installed in the front end of the cooling part 174. By pressurizing the exhaust gas to be supplied to the cooling part 174 by the compressor 174c, cooling of the exhaust gas in the cooling part 174 may be easily performed.

The blower 171d may be installed above the absorption part 171. The blower 171d is provided to help exhaust gas from the absorption part 171 to be discharged, and at least one of the blower may be installed above the absorption part 171. By installing the blower 171d above the absorption part 171, it is easy to discharge the exhaust gas from which carbon dioxide is separated, and the exhaust gas may flow smoothly from the cooling part 174 to the absorption part 171.

Hereinafter, an exhaust gas purification apparatus according to an embodiment of the present disclosure will be described in detail with reference to FIGS. 6 and 7.

The exhaust gas purification apparatus according to an embodiment of the present disclosure is an apparatus for removing carbon dioxide contained in exhaust gas, and may be installed in a ship.

The exhaust gas purification apparatus is provided with a heat exchanger installed on the first exhaust pipe to exchange heat between exhaust gas to be discharged to the outside and an absorbent in which carbon dioxide discharged from an absorption tower is absorbed, thereby increasing the temperature of the absorbent. Therefore, the operation of a boiler that generates steam to increase the temperature of the absorbent is stopped, the energy that is consumed by the boiler may be reduced, and the generation of additional carbon dioxide due to the operation of the boiler may be prevented. In addition, because a conventional regeneration tower for separating carbon dioxide from the absorbent may be omitted, installation and maintenance costs may be reduced, and space utilization within the ship may be improved.

Hereinafter, an exhaust gas purification apparatus 200 will be described in detail with reference to FIG. 6.

Figure 6:
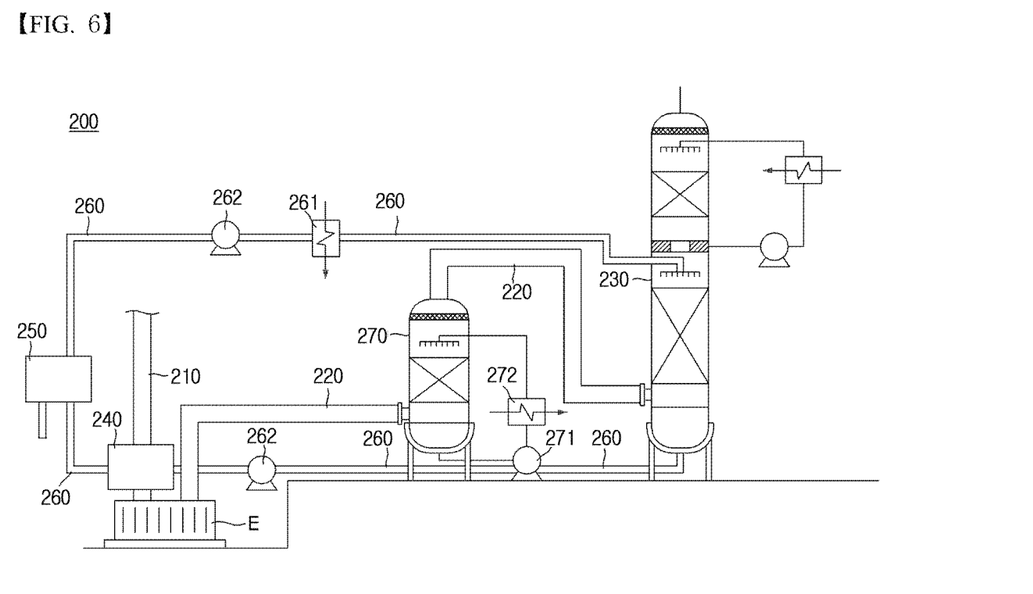
FIG. 6 is a diagram illustrating a configuration of an exhaust gas purification apparatus according to an embodiment of the present disclosure.

FIG. 6 is a diagram illustrating a configuration of an exhaust gas purification apparatus according to an embodiment of the present disclosure.

The exhaust gas purification apparatus 200 according to the present disclosure includes a first exhaust pipe 210, a second exhaust pipe 220, an absorption tower 230, a heat exchanger 240, and a separator 250.

The first exhaust pipe 210 is provided to directly discharge exhaust gas discharged from the combustion engine E to the outside of the ship, and may discharge exhaust gas that has passed through an exhaust gas pretreatment facility, such as a selective catalytic reduction (SCR) facility, a dust collection facility, and a desulfurization facility, to the outside.

The second exhaust pipe 220 is a pipe that is directly connected to the combustion engine E or branched from the first exhaust pipe 210 to move the exhaust gas to the carbon dioxide removal process, and may move the exhaust gas that has passed through the exhaust gas pretreatment facility to the carbon dioxide removal process. When the second exhaust pipe 220 is branched from the first exhaust pipe 210, the second exhaust pipe 220 may be branched on the first exhaust pipe 210 at a front end of the heat exchanger 240, which will be described later. The second exhaust pipe 220 is connected to the absorption tower 230.

The absorption tower 230 is provided to atomize and spray the absorbent that has absorbed carbon dioxide contained in the exhaust gas supplied through the second exhaust pipe 220, and may be formed as a gas contact type absorption tower to easily cope with the fluctuations of the ship. Herein, the absorbent may be a solution having a property of absorbing carbon dioxide, for example, an aqueous solution of an amine compound or ammonia. The exhaust gas is supplied to a lower portion of the absorption tower 230 and comes into contact with the absorbent injected from an upper portion of the absorption tower 230, and due to this, the carbon dioxide contained in the exhaust gas may be absorbed by the absorbent and removed from the exhaust gas. The exhaust gas from which the carbon dioxide is removed may be discharged to the outside through the upper portion of the absorption tower 230. Because an exothermic reaction occurs when carbon dioxide is absorbed by the absorbent in absorption tower 230, the exhaust gas from which the carbon dioxide is removed may be discharged to the outside after being subjected to a separate cooling process in the upper portion of the absorption tower 230. For example, the exhaust gas from which the carbon dioxide is removed may be discharged after being cooled by coming into contact with a cooling medium such as fresh water sprayed from the upper portion of the absorption tower 230, and the cooling medium may be collected after coming into contact with the exhaust gas and discharged to the outside of the absorption tower 230, and then circulated back to the absorption tower 230 through pressurization and cooling processes. A cooling tower 270 is installed at a front end of the absorption tower 230 on the second exhaust pipe 220.

The cooling tower 270 is provided to cool the exhaust gas supplied to the absorption tower 230 along the second exhaust pipe 220, and may spray cooling water onto the exhaust gas to cool the exhaust gas. For example, the cooling tower 270 may be a scrubber that sprays washing water onto the exhaust gas. Because the exhaust gas emitted from the combustion engine E installed in the ship is at a high temperature of about 400° C., when this exhaust gas is directly supplied to the above-described absorption tower 230, carbon dioxide is not properly absorbed by the absorbent. That is, because the absorbent sprayed from the absorption tower 230 has a high absorption efficiency of carbon dioxide at about 30 to 50° C., the exhaust gas is cooled in advance in the cooling tower 270. The exhaust gas supplied to the cooling tower 270 is cooled to an appropriate temperature through heat exchange with cooling water, and the cooling water whose temperature has increased by heat exchange with the exhaust gas is discharged from the cooling tower 270 and then circulated back to the cooling tower 270 through a series of cooling processes. For example, the cooling water discharged from the cooling tower 270 may be pressurized in a pump 271, cooled by heat exchange with a cooling medium in a heat exchanger 272, and then circulated to the cooling tower 270. The exhaust gas cooled in the cooling tower 270 is supplied to the absorption tower 230 through the second exhaust pipe 220 to remove the carbon dioxide through the above-described series of processes, and the absorbent that has absorbed the carbon dioxide in the absorption tower 230 is supplied to the heat exchanger 240 through a circulation line 260, which will be described later.

The heat exchanger 240 is provided to exchange heat with the exhaust gas flowing through the first exhaust pipe 210 and the absorbent in which the carbon dioxide discharged from the absorption tower 230 is absorbed, and may be installed at the rear end of the exhaust gas pretreatment facility on the first exhaust pipe 210. That is, the absorbent that has absorbed the carbon dioxide discharged from the absorption tower 230 and supplied to the heat exchanger 240 is heated through heat exchange with the exhaust gas of a high temperature flowing through the first exhaust pipe 210, and the exhaust gas cooled by heat exchange with the absorbent is discharged to the outside through the first exhaust pipe 210. As the heat exchanger 240 exchanges heat with the absorbent, that has absorbed the carbon dioxide, and the exhaust gas, the temperature of the absorbent increases so that the carbon dioxide may be easily separated from the absorbent in the separator 250, which will be described later, and a separate cooling process for cooling and discharging the exhaust gas of a high temperature may be omitted. In addition, because there is no need to operate a boiler for generating steam to increase the temperature of the absorbent, energy consumed in the boiler may be reduced, and the generation of additional carbon dioxide due to the operation of the boiler may be prevented. Furthermore, because a conventional regeneration tower for separating carbon dioxide from the absorbent may be omitted, installation and maintenance costs may be reduced, and as the system configuration is simplified, space utilization within the ship may be improved. The absorbent heated in the heat exchanger 240 is supplied to the separator 250 through the circulation line 260.

The separator 250 is provided to separate carbon dioxide from the absorbent, and may be installed at a rear end of the heat exchanger 240 on the circulation line 260. The absorbent that has absorbed the carbon dioxide heated in the heat exchanger 240 is separated from the carbon dioxide by thermal energy in the separator 250. Because the absorbent is in a heated state by exchanging heat with the exhaust gas of about 400° C. flowing through the first exhaust pipe 210, even when no additional thermal energy is supplied to the separator 250, the carbon dioxide may be easily separated. The carbon dioxide of a high concentration separated from the absorbent is discharged to the outside of the separator 250 to remove moisture, and then may be supplied to a required place through a separate compression process.

The circulation line 260 may have one end connected to a lower end of the absorption tower 230 and the other end connected to an upper end of the absorption tower 230 through the heat exchanger 240 and the separator 250 in turn so as to circulate the absorbent from which carbon dioxide is separated to the absorption tower 230. In other words, the absorbent that has absorbed carbon dioxide in the absorption tower 230 passes through the heat exchanger 240 through the circulation line 260 and is then supplied to the separator 250 to separate the carbon dioxide, and the absorbent from which carbon dioxide is separated in the separator 250 is circulated to the absorption tower 230 through the circulation line 260. Because at least one of the cooler 261 is installed at the rear end of the separator 250 on the circulation line 260, the absorbent to be circulated to the absorption tower 230 may be cooled. As the cooler 261 cools the absorbent to reduce the temperature of the absorbent, the carbon dioxide may be easily absorbed by the absorbent in the absorption tower 230. In addition, at least one pressure pump 262 is installed on the circulation line 260 so that the absorbent may be circulated smoothly.

Hereinafter, an operation of the exhaust gas purification apparatus 200 will be described in more detail with reference to FIG. 7.

Figure 7:
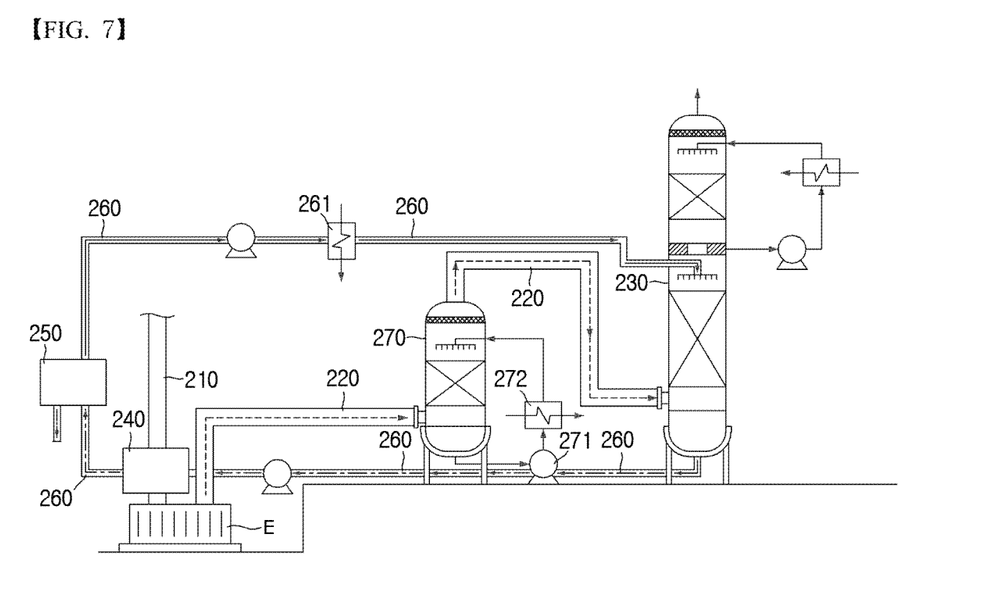
FIG. 7 is an operation diagram for explaining an operation of the exhaust gas purification apparatus.

FIG. 7 is an operation diagram for explaining an operation of the exhaust gas purification apparatus.

The exhaust gas purification apparatus 200 according to the present disclosure is provided with the heat exchanger 240 installed on the first exhaust pipe 210 to exchange heat between the exhaust gas to be discharged to the outside and the absorbent in which the carbon dioxide discharged from the absorption tower 230 is absorbed, thereby increasing the temperature of the absorbent. Therefore, the operation of a boiler that generates steam to increase the temperature of the absorbent is stopped, the energy that is consumed by the boiler may be reduced, and the generation of additional carbon dioxide due to the operation of the boiler may be prevented. In addition, because a conventional regeneration tower for separating carbon dioxide from the absorbent may be omitted, installation and maintenance costs may be reduced, and space utilization within the ship may be improved.

Referring to FIG. 7, a part of the exhaust gas discharged from the combustion engine E is discharged through the first exhaust pipe 210, and a part thereof is discharged through the second exhaust pipe 220.

The exhaust gas discharged through the second exhaust pipe 220 is supplied to the cooling tower 270 and cooled to an appropriate temperature by cooling water sprayed from the cooling tower 270, and is then supplied to the absorption tower 230 through the second exhaust pipe 220 connected to an upper portion of the cooling tower 270. The cooling water, whose temperature has increased by exchanging heat with the exhaust gas in the cooling tower 270, is discharged to a lower portion of the cooling tower 270, is pressurized in the pump 271, is cooled by heat exchange with a cooling medium in the heat exchanger 272, and is then circulated back to the cooling tower 270.

The exhaust gas supplied to the lower portion of the absorption tower 230 comes into contact with the absorbent sprayed from the upper portion of the absorption tower 230, and due to this, carbon dioxide contained in the exhaust gas is absorbed by the absorbent and removed from the exhaust gas. Because the exhaust gas is in a cooled state in the cooling tower 270, the carbon dioxide contained in the exhaust gas may be easily absorbed by the absorbent. The exhaust gas from which the carbon dioxide has been removed moves to the upper portion of the absorption tower 230, and is subjected to a separate cooling process and then exhausted to the outside.

The absorbent that has absorbed carbon dioxide is supplied to the heat exchanger 240 through the circulation line 260 to exchange heat with the exhaust gas of a high temperature flowing through the first exhaust pipe 210, and due to this, the exhaust gas to be discharged to the outside is cooled, and the absorbent that has absorbed carbon dioxide is heated. The absorbent that has absorbed the carbon dioxide heated in the heat exchanger 240 is supplied to the separator 250 through the circulation line 260 to separate the carbon dioxide, and the carbon dioxide separated from the absorbent is discharged to the outside of the separator 250 to be supplied to a required place.

The absorbent from which the carbon dioxide is separated is supplied to the cooler 261 through the circulation line 260 and cooled and then circulated to the upper portion of the absorption tower 230. Although the embodiments of the present disclosure have been described above with reference to the accompanying drawings, those of ordinary skill in the art to which the present disclosure pertains will understand that the present disclosure may be implemented in other specific forms without changing the technical spirit or essential features thereof. Therefore, it should be understood that the embodiments described above are illustrative in all aspects and not restrictive.

The invention claimed is:

1. An exhaust pipe apparatus comprising:
a first exhaust pipe provided to directly discharge exhaust gas discharged from a combustion engine of a ship to the outside;
a second exhaust pipe connected in parallel with the first exhaust pipe and having a branch pipe connected to one side thereof such that the exhaust gas is directly discharged to the outside or discharged through the branch pipe;
a first damper installed in the second exhaust pipe to control a flow of the exhaust gas to be directly discharged to the outside or discharged through the branch pipe; and
a first economizer installed on the first exhaust pipe to generate steam by heat exchange with the exhaust gas, wherein the exhaust gas discharged to the branch pipe and the steam are supplied to a carbon dioxide capture apparatus.

2. The exhaust pipe apparatus according to claim 1, wherein
the first exhaust pipe and the second exhaust pipe are provided by partitioning the inside of an exhaust pipe formed of an integral body.

3. The exhaust pipe apparatus according to claim 1, further comprising
a second damper installed in at least one of the first exhaust pipe and the second exhaust pipe to adjust a flow amount of the exhaust gas to be discharged through the first exhaust pipe and the second exhaust pipe.

4. The exhaust pipe apparatus according to claim 3, further comprising
a second economizer installed at at least one of a position between the first exhaust pipe and the second exhaust pipe at a front end of the second damper and a position between the first exhaust pipe and the second exhaust pipe between the second damper and the first damper, to generate first auxiliary steam by exchanging heat with the exhaust gas,
wherein the first auxiliary steam is supplied to a carbon dioxide capture apparatus.

5. The exhaust pipe apparatus according to claim 1, further comprising
a third economizer installed in the second exhaust pipe at a rear end of the first damper to generate second auxiliary steam by exchanging heat with the exhaust gas.

6. A ship comprising:
a hull;
a first exhaust pipe provided to directly discharge exhaust gas discharged from a combustion engine installed in the hull to the outside;
a second exhaust pipe connected in parallel with the first exhaust pipe and having a branch pipe connected to one side thereof such that the exhaust gas is directly discharged to the outside or discharged through the branch pipe;
a first damper installed in the second exhaust pipe to control a flow of the exhaust gas to be directly discharged to the outside or discharged through the branch pipe;
a first economizer installed on the first exhaust pipe to generate steam by heat exchange with the exhaust gas; and
a carbon dioxide capture apparatus provided to receive the exhaust gas discharged from the branch pipe and the steam to remove carbon dioxide contained in the exhaust gas.

7. The ship according to claim 6, wherein the carbon dioxide capture apparatus comprising:
an absorption part provided to spray an absorbent in which carbon dioxide is absorbed onto the exhaust gas;
a regeneration part provided to receive the absorbent in which the carbon dioxide is absorbed from the absorption part and separate the carbon dioxide from the absorbent; and
a reboiler provided to heat the absorbent supplied to the regeneration part using the steam.

8. The ship according to claim 7, further comprising
a first supply pipe provided to supply the steam generated in the first economizer to the reboiler.

9. The ship according to claim 8, further comprising:
a second economizer installed between the first exhaust pipe and the second exhaust pipe to generate first auxiliary steam by exchanging heat with the exhaust gas; and
a second supply pipe provided to supply the first auxiliary steam to the reboiler.

10. The ship according to claim 7, further comprising
a controller provided to adjust an amount of steam to be supplied to the reboiler in response to an amount of exhaust gas emission of the combustion engine.

* * * * *